United States Patent
Qian et al.

(10) Patent No.: US 12,316,169 B2
(45) Date of Patent: May 27, 2025

(54) LINEAR DRIVING APPARATUS

(71) Applicant: AAC Microtech (Changzhou) Co., Ltd., Changzhou (CN)

(72) Inventors: Lin Qian, Shenzhen (CN); Weiling Shi, Shenzhen (CN); Min Chen, Shenzhen (CN); Shun Guo, Shenzhen (CN); Xueyuan Zhu, Shenzhen (CN); Yu Huang, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 0 days.

(21) Appl. No.: 17/919,537

(22) PCT Filed: Jul. 28, 2022

(86) PCT No.: PCT/CN2022/108446
§ 371 (c)(1),
(2) Date: Oct. 18, 2022

(87) PCT Pub. No.: WO2024/000713
PCT Pub. Date: Jan. 4, 2024

(65) Prior Publication Data
US 2025/0125690 A1    Apr. 17, 2025

(30) Foreign Application Priority Data
Jun. 30, 2022  (CN) ................. 202210772232.3

(51) Int. Cl.
| | | |
|---|---|---|
| H02K 11/21 | (2016.01) | |
| H02K 3/28  | (2006.01) | |
| H02K 11/33 | (2016.01) | |
| H02K 41/03 | (2006.01) | |

(52) U.S. Cl.
CPC ............... *H02K 11/21* (2016.01); *H02K 3/28* (2013.01); *H02K 11/33* (2016.01); *H02K 41/031* (2013.01)

(58) Field of Classification Search
CPC ........ H02K 41/031; H02K 3/28; H02K 11/21; H02K 11/33
See application file for complete search history.

(56) References Cited

U.S. PATENT DOCUMENTS 11,277,063 B2 *   3/2022   Trolliet ................. H02K 41/031

FOREIGN PATENT DOCUMENTS

| CN | 109004805 B | * | 4/2020 | ............. H02K 16/02 |
| CN | 111049354 A | * | 4/2020 | |
| CN | 109586543 B | * | 11/2020 | ........... H02K 41/031 |

(Continued)

*Primary Examiner* — Mohamad A Musleh
(74) *Attorney, Agent, or Firm* — Wiersch Law Group

(57) ABSTRACT

The present disclosure provides a linear driving apparatus. The linear driving apparatus includes: stators; rotors slidably arranged on the stators; a driving component configured to drive the rotors to slide along an extension direction of the stators; first position feedback units provided with one first position feedback unit provided with a marking signal; and second position feedback units arranged on the stators and spaced apart. The second position feedback units is configured to read position information of the first position feedback units and read the marking signal. The linear driving apparatus in the present disclosure can simplify a manner of identifying the rotor without additional sensors, thereby reducing costs.

10 Claims, 7 Drawing Sheets

(56) References Cited

FOREIGN PATENT DOCUMENTS

| | | | | | |
|---|---|---|---|---|---|
| CN | 112187008 | A | * | 1/2021 | ............... H02K 1/18 |
| CN | 112187009 | A | * | 1/2021 | ............... H02K 1/18 |
| CN | 112234795 | A | * | 1/2021 | ............. H02K 11/21 |
| JP | 2006353024 | A | * | 12/2006 | |
| WO | WO-9112648 | A1 | * | 8/1991 | |

* cited by examiner

B-B

LINEAR DRIVING APPARATUS

TECHNICAL FIELD

The present disclosure relates to the technical field of linear driving, and in particular, to a linear driving apparatus.

BACKGROUND

In a multi-rotor direct drive transmission system, there is a need to number each rotor and identify a position of each rotor in the system in real time, so as to effectively control and schedule all rotors.

As for sorting of the numbers of the multiple rotors, an existing method involves: identifying the number of the first rotor in the multi-rotor direct drive transmission system, and then sorting and numbering the rotors in ascending or descending order according to a sequence.

Current manners of identifying the rotors in the multi-rotor direct drive transmission system are as follows. 1. Sequential arrangement of a magnet of a rotor is transformed so as to distinguish the magnet from other rotor magnets, and a position of the rotor is determined through a magnetic field difference. 2. A rotor is identified through a third-party position detection unit.

In the first identification manner, it is excessively complicated to determine the position of the rotor through the magnetic field difference. In the second identification manner, detection and identification through a third-party sensor requires an additional sensor, which may increase cost of devices of the system.

Therefore, a linear driving apparatus is urgently needed now to solve the problem that the manner of identifying the rotors in the existing multi-rotor direct drive transmission system is excessively complicated and costly.

SUMMARY

The technical problem to be solved in the present disclosure is how to provide a linear driving apparatus to solve the problem that the manner of identifying the rotors in the existing multi-rotor direct drive transmission system is excessively complicated and costly.

The present disclosure is implemented as follows. A linear driving apparatus is provided, including:
- a plurality of stators successively spliced into a one-piece;
- a plurality of rotors slidably arranged on the plurality of stators;
- a driving component configured to drive the plurality of rotors to slide along an
- extension direction of the plurality of stators;
- a plurality of first position feedback units, wherein each of the plurality of rotors is provided with one of the plurality of first position feedback units, and one of the plurality of first position feedback units is provided with a marking signal; and
- a plurality of second position feedback units arranged on the plurality of stators and spaced apart from each other, wherein the plurality of second position feedback units is arranged corresponding to the plurality of first position feedback units, and is configured to read position information of the plurality of first position feedback units and read the marking signal, wherein when any one of the plurality of second position feedback units reads the marking signal, the second position feedback unit is configured to confirm a position of the rotor corresponding thereto, use the confirmed position of the rotor as a starting point, and sort all rotors according to an order of positions of other rotors in the linear driving apparatus, so as to complete numbering of all rotors.

As an improvement, the plurality of first position feedback units constitutes grating scales; and the plurality of second position feedback units constitutes reading heads corresponding to the plurality of first position feedback units.

As an improvement, each one of the plurality of stators comprises a bottom plate, a top plate arranged in parallel with and spaced from the bottom plate, and a fixation plate that connects the bottom plate with the top plate; and the plurality of first position feedback units is arranged on sides of the plurality of rotors adjacent to the fixation plates, respectively, and the plurality of second position feedback units is arranged on the fixation plates at intervals.

As an improvement, a mounting groove is provided through a position of the fixation plate corresponding to each of the plurality of second position feedback units, and one second position feedback unit is fixedly mounted in the mounting groove.

As an improvement, a guide rail is provided on a side of the bottom plate adjacent to the top plate; at least two pulleys are spaced at intervals on a side of each of the plurality of rotors adjacent to the guide rail, the at least two pulleys on each of the plurality of rotors abut against two sides of the guide rail, respectively, and form a sliding connection, and the plurality of rotors slides freely under the plurality of stators through matching the pulley with the guide rail.

As an improvement, each of the plurality of rotors comprises a fixation portion spaced from the stator, two sliding plates spaced at intervals on a side of the fixation portion adjacent to the guide rail, a mounting portion arranged on a side of the fixation portion away from the bottom plate, an extending portion arranged on a side of the mounting portion adjacent to the fixation plate, and a T-shaped structure portion arranged on a side of the mounting portion away from the fixation plate; the two sliding plates on the rotors abut against the two sides of the guide rail, respectively, and form a sliding connection, the two sliding plates on the plurality of rotors are respectively spaced from the pulleys corresponding thereto, and the T-shaped structure portion extends to a side of the top plate away from the bottom plate and is spaced from the top plate; the pulleys on the plurality of rotors are arranged on a side of the fixation portion adjacent to the guide rail, and the first position feedback unit on each of the plurality of rotors is arranged on a side of the extending portion adjacent to the fixation plate.

As an improvement, four pulleys are arranged on the plurality of rotors, the four pulleys on the plurality of rotors abuts against the two sides of the guide rail in pairs, and the sliding plate is arranged between each pair of the pulleys.

As an improvement, the driving component comprises a plurality of coils arranged on a side of the top plate adjacent to the bottom plate and a magnet arranged on the mounting portion of each of the plurality of rotors, and the magnet corresponds to and is spaced from the coils.

As an improvement, the driving component further comprises a first conducting magnet arranged between the top plate and the plurality of coils and a second conducting magnet arranged between the corresponding mounting portion and the magnet; a plurality of protruding portions protruding towards the rotor are spaced at intervals on a side of the first conducting magnet adjacent to the bottom plate, each of the plurality of coils is arranged around one of the protruding portions; and a plurality of magnets is provided and spaced at intervals on the second conducting magnet.

As an improvement, a first recessing portion recessed away from the rotor is arranged at a position of the top plate corresponding to the first conducting magnet, the first conducting magnet is arranged in the first recessing portion; a second recessing portion recessed away from the stator is arranged at a position of the mounting portion of each of the plurality of rotors corresponding to the second conducting magnet, the second conducting magnet is arranged in the second recessing portion.

Compared with the related art, in the linear driving apparatus in the present disclosure, a first position feedback unit is arranged on each rotor, a plurality of second position feedback units is spaced at a position of the stator corresponding to the first position feedback unit, one first position feedback unit is provided with a marking signal, and the second position feedback units are configured to read position information of the first position feedback units and read the marking signals. In this way, in the identification of the rotor, the marking signal can be read by the second position feedback unit to judge the position of the rotor corresponding thereto, and then when all rotors are numbered, all rotors can be sorted based on rotors of which position information has been acquired, so as to complete the numbering of all rotors. When the rotor is identified based on the linear driving apparatus, the manner of identifying the rotor can be simplified, and cost of the linear driving apparatus can be further reduced without additional sensors.

BRIEF DESCRIPTION OF DRAWINGS

In order to more clearly illustrate the technical solutions in embodiments of the present disclosure or the related art, the accompanying drawings used in the description of the embodiments or the related art will be briefly introduced below. It is apparent that, the accompanying drawings in the following description are only some embodiments of the present disclosure, and other drawings can be obtained by those of ordinary skill in the art from the provided drawings without creative efforts.

100. linear driving apparatus; 1. stator; 11. bottom plate; 12. side plate; 13. top plate; 131. first recessing portion; 14. fixation plate; 141. mounting groove; 15. guide rail; 151. first chute; 2. rotor; 21 pulley; 211. second chute; 22. fixation portion; 23. sliding plate; 231. third chute; 24. mounting portion; 241. second recessing portion; 25. extension portion; 26. T-shaped structure portion; 3. driving component; 31. coil; 32. magnet; 33. first conducting magnet; 331. protruding portion; 34. second conducting magnet; 4. first position feedback unit; 41. marking signal; 5. second position feedback unit; 6. transmission line.

DESCRIPTION OF EMBODIMENTS

In order to make the objectives, technical solutions, and advantages of the present disclosure more clearly understood, the present disclosure is described in further detail below with reference to the accompanying drawings and embodiments. It should be understood that specific embodiments described herein are intended only to interpret the present disclosure and not intended to limit the present disclosure.

Figure 1:
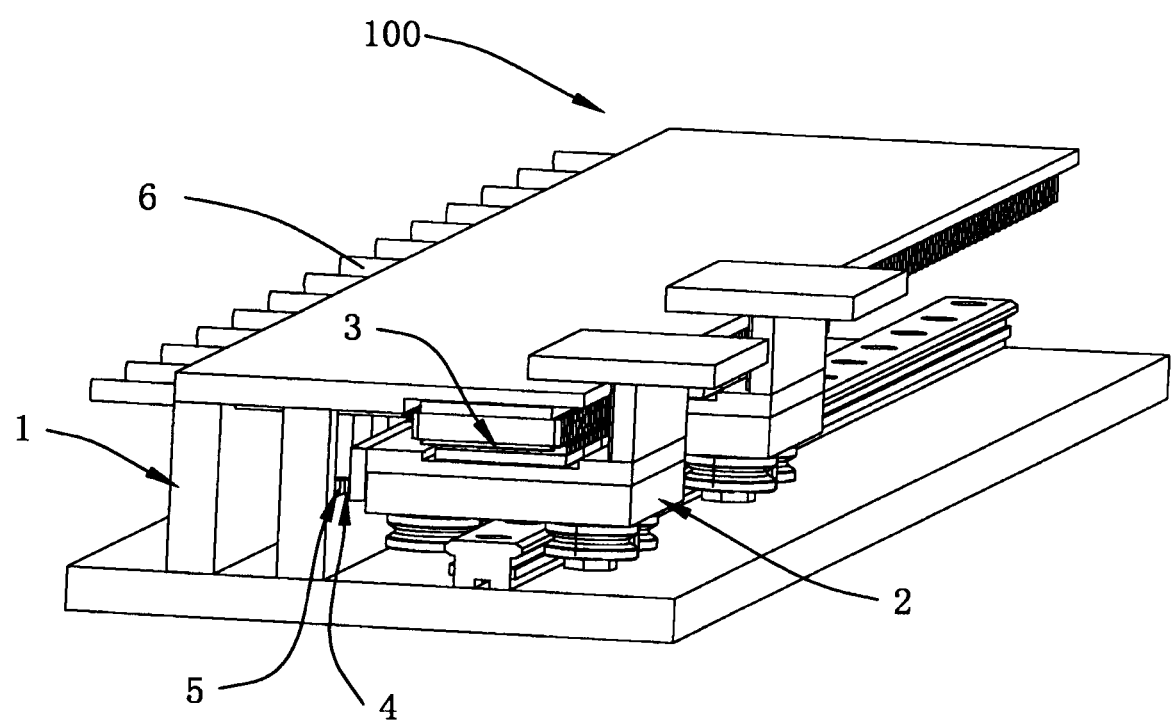
FIG. 1 is a schematic diagram of an overall structure of a linear driving apparatus according to an embodiment of the present disclosure.
Figure 2:
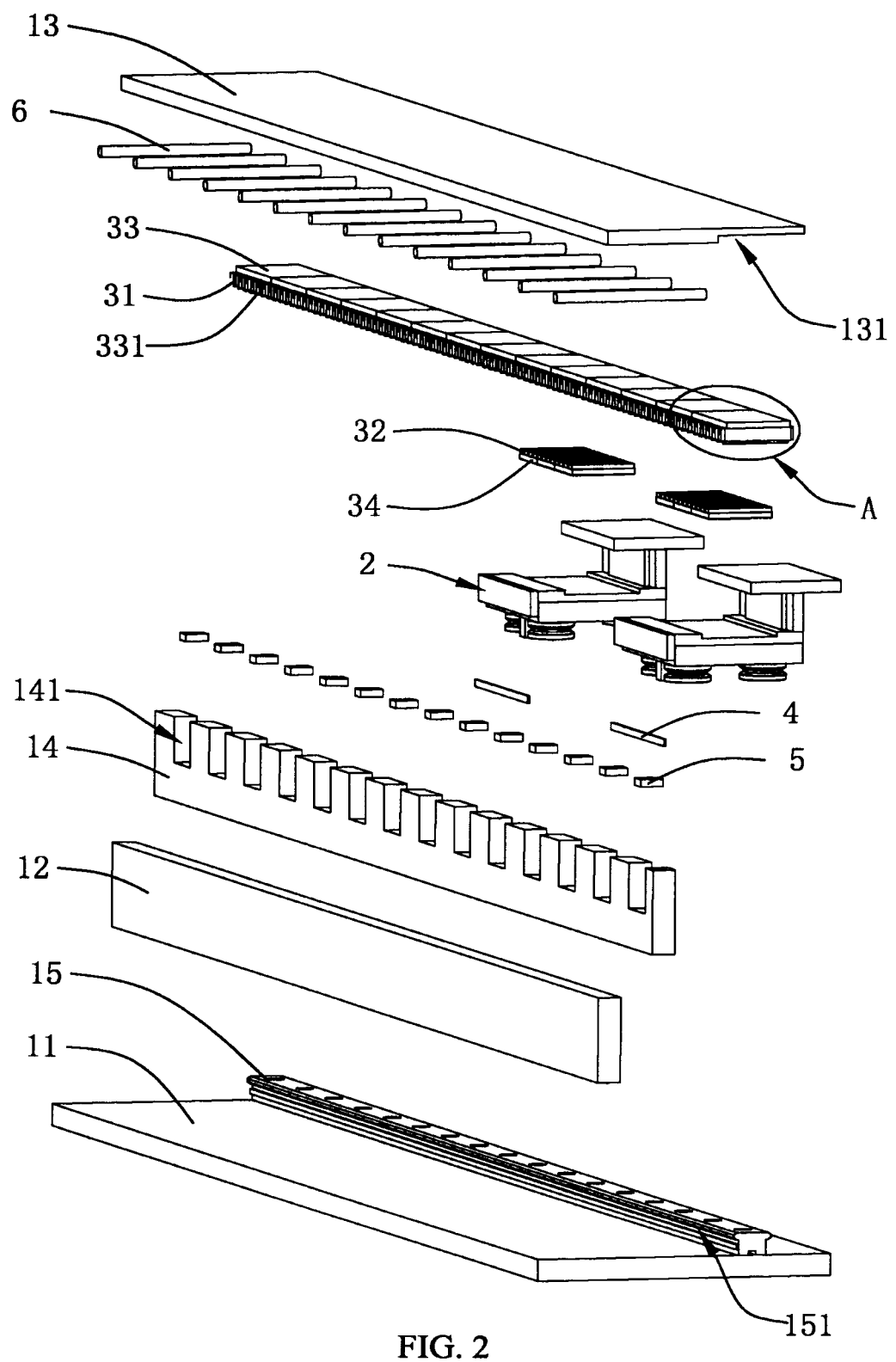
FIG. 2 is an exploded view of a linear driving apparatus according to an embodiment of the present disclosure.
Figure 3:
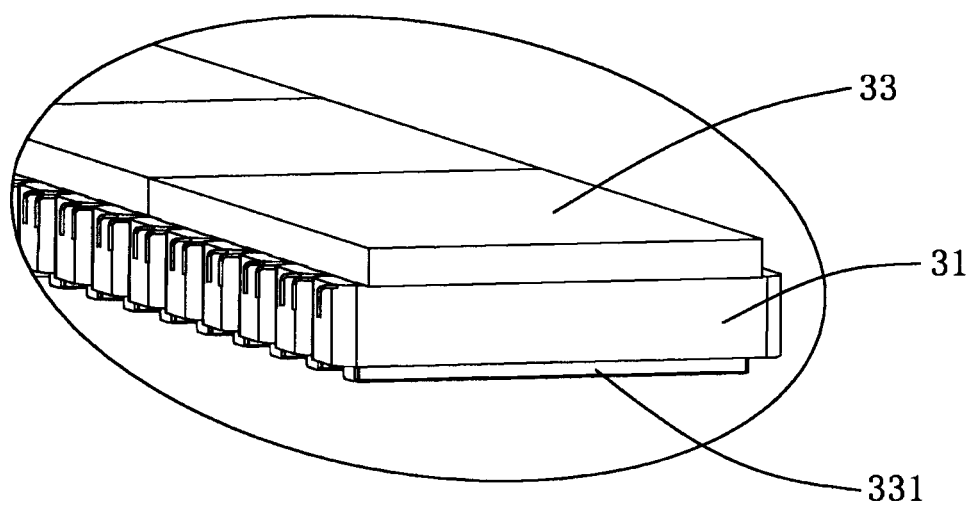
FIG. 3 is an enlarged view of a structure of a part A shown in FIG. 2 according to an embodiment of the present disclosure.
Figure 4:
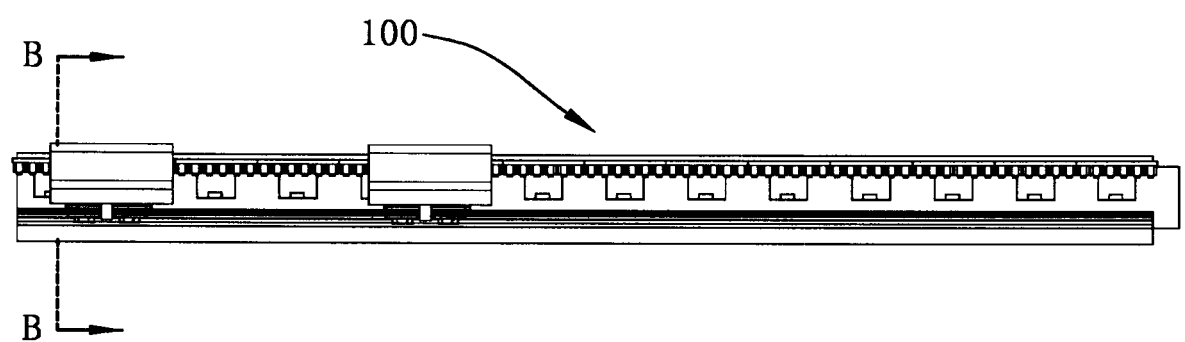
FIG. 4 is a structural front view of a linear driving apparatus according to an embodiment of the present disclosure.
Figure 5:
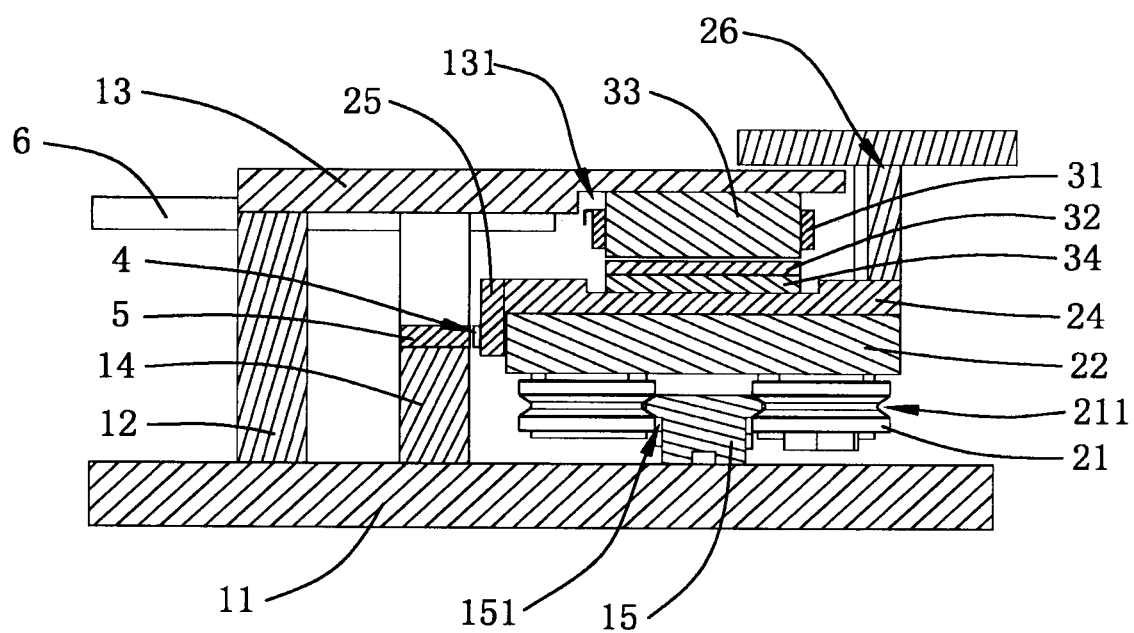
FIG. 5 is a sectional view taken along a line B-B shown in FIG. 4 according to an embodiment of the present disclosure.
Figure 6:
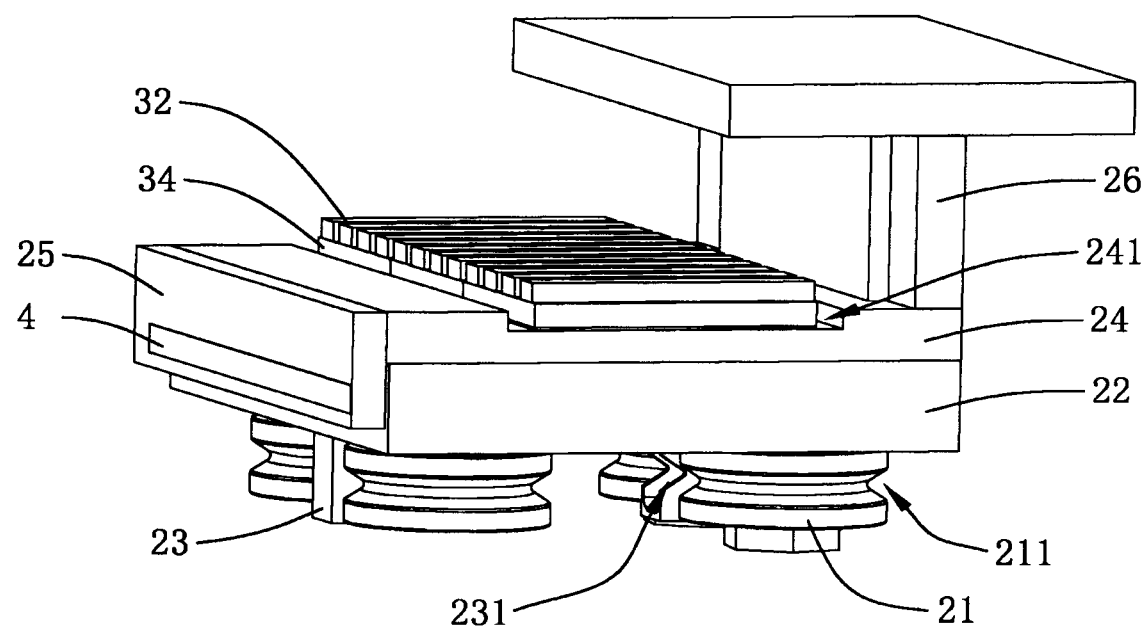
FIG. 6 is a schematic structural diagram of a rotor and surrounding members thereof in a linear driving apparatus according to an embodiment of the present disclosure.
Figure 7:
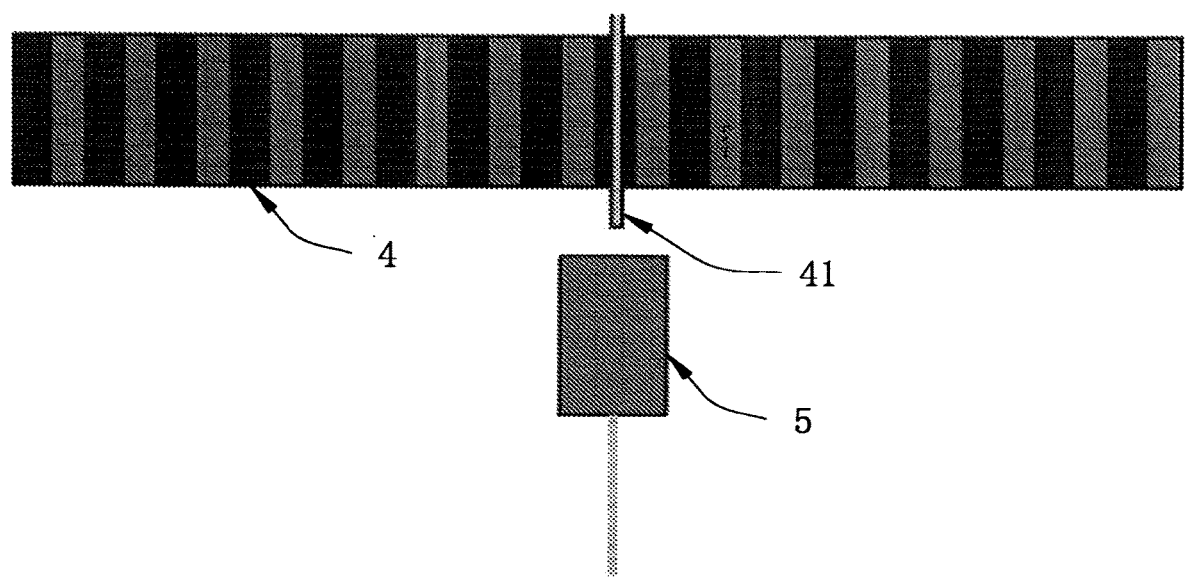
FIG. 7 is a simple planar diagram of a first position feedback unit and a second position feedback unit in a linear driving apparatus according to an embodiment of the present disclosure.

The present disclosure provides a linear driving apparatus 100. Referring to FIG. 1 to FIG. 7, the linear driving apparatus 100 includes a plurality of stators 1, a plurality of rotors 2, a driving component 3, a first position feedback unit 4, and a plurality of second position feedback units 5.

The plurality of rotors 2 is provided and slidably arranged on the plurality of stators 1. The driving component 3 is configured to drive the plurality of rotors 2 to slide along an extension direction of the stator 1. A plurality of first position feedback units 4 is provided. Each of the rotors 2 is provided with one of the first position feedback units 4. One of the first position feedback units 4 is provided with a marking signal 41. A plurality of second position feedback units 5 is provided. The plurality of second position feedback units 5 is arranged on the stator 1 and spaced apart. The second position feedback units 5 are arranged corresponding to the first position feedback units 4, and are configured to read position information of the first position feedback units and read the marking signals 41.

When any one of the second position feedback units 5 reads the marking signal 41, the second position feedback unit 5 confirms a position of the rotor 2 corresponding thereto, uses the confirmed position of the rotor 2 as a starting point, and sorts all rotors 2 according to an order of positions of other rotors 2 in the linear driving apparatus 100, so as to complete the numbering of all rotors 2.

The second position feedback units 5 are arranged corresponding to the first position feedback units 4, provided that the second position feedback units 5 can match with the first position feedback units 4 to feed back the position of the rotor 2, which may also be understood as that the second position feedback units 5 are arranged directly facing the first position feedback units 4.

Numbers of the rotor 2, the first position feedback unit 4, and the second position feedback unit 5 are set according to actual requirements, which are not limited herein.

In an embodiment, the stator 1 includes a bottom plate 11, a side plate 12 vertically arranged on the bottom plate 11, a top plate 13 arranged on a side of the side plate 12 away from the bottom plate 11 and parallel to the bottom plate 11, and a fixation plate 14 vertically connected to the bottom plate 11 and the top plate 13. The plurality of first position feedback units 4 are arranged on sides of the plurality of rotors 2 adjacent to the fixation plates 14 respectively, and the plurality of second position feedback units 5 are arranged on the fixation plates 14 at intervals.

An edge of the top plate 13 is connected to an edge of the side plate 12. The fixation plate 14 and the side plate 12 are spaced.

The plurality of second position feedback units 5 are uniformly arranged on the fixation plate 14 along a length direction of the guide rail 15.

In an embodiment, a mounting groove 141 is provided through a position of the fixation plate 14 corresponding to each of the second position feedback units 5, and one of the second position feedback units 5 is fixedly mounted in each of the mounting grooves 141. In this way, it is easy to arrange the second position feedback unit 5, and there is no need to increase an extra layout space for the second position feedback unit 5.

In an embodiment, the side of the bottom plate 11 adjacent to the top plate 13 is provided with a guide rail 15. At least two pulleys 21 are spaced at intervals on a side of each of the rotors 2 adjacent to the guide rail 15. The at least two pulleys 21 on each of the rotors 2 abut against two sides of the guide rail 15 respectively and form a sliding connection. Such arrangement can facilitate a sliding action between the rotor 2 and the stator 1.

At least one pulley 21 is arranged on two sides of the guide rail 15 corresponding to each rotor 2.

The two sides of the guide rail 15 are each provided with a first chute 151 recessed inwards. A peripheral wall of the pulley 21 is provided with a second chute 211 recessed inwards. One side wall of the second chute 211 in the pulley 21 is slidably arranged in the first chute 151, while the other side wall of the first chute 151 in the guide rail 15 is slidably arranged in the second chute 211.

In an embodiment, each rotor 2 includes a fixation portion 22 spaced from the stator 1, two sliding plates 23 spaced at intervals on a side of the fixation portion 22 adjacent to the guide rail 15, a mounting portion 24 arranged on a side of the fixation portion 22 away from the bottom plate 11, an extending portion 25 arranged on a side of the mounting portion 24 adjacent to the fixation plate 14, and a T-shaped structure portion 26 arranged on a side of the mounting portion 24 away from the fixation plate 14. The two sliding plates 23 on each of the rotors 2 abut against two sides of the guide rail 15 respectively and form a sliding connection, the two sliding plates 23 on each of the rotors 2 are respectively spaced from the pulleys 21 corresponding thereto, and the T-shaped structure portion 26 extends to a side of the top plate 13 away from the bottom plate 11 and is spaced from the top plate 13. The pulleys 21 on each of the rotors 2 are arranged on a side of the fixation portion 22 adjacent to the guide rail 15, and the first position feedback unit 4 on each of the rotors 2 is arranged on a side of the extending portion 25 adjacent to the fixation plate 14.

A third chute 231 recessed inwards is arranged at a position of the sliding plate 23 corresponding to one side wall of the first chute 151, and one side wall of the first chute 151 in the guide rail 15 is slidably arranged in the third chute 231.

In an embodiment, four pulleys 21 on each rotor 2 are arranged on the two sides of the guide rail 15 in pairs, and the first position feedback unit on each rotor 2 is arranged on a side of the extending portion 25 adjacent to the fixation plate 14.

The two sliding plates 23 on each rotor 2 are arranged symmetrically, and are arranged between the two pulleys 21 on a same side of the corresponding guide rail 15 on each rotor 2.

In an embodiment, the driving component 3 includes a plurality of coils 31 arranged on a side of the top plate 13 adjacent to the bottom plate 11 and a magnet 32 arranged on the mounting portion 24 of each of the rotors 2, and the magnets 32 correspond to and are spaced from the coils 31.

The number of the coil 31 is set according to an actual requirement, which is not limited herein. However, a plurality of coils 31 are uniformly arranged along a length direction of the guide rail 15.

In an embodiment, the driving component 3 further includes a first conducting magnet 33 arranged between the top plate 13 and the plurality of coils 31 and a second conducting magnet 34 arranged between the corresponding mounting portion 24 and the magnet 32. A plurality of protruding portions 331 protruding towards the rotor 2 are spaced at intervals on a side of the first conducting magnet 33 adjacent to the bottom plate 11, and each of the coils 31 is arranged around one of the protruding portions 331. A plurality of magnets 32 are provided and arranged on the second conducting magnet 34 at intervals. With such arrangement, magnetic force between the coil 31 and the magnet 32 can be strengthened, so as to drive the rotor 2 to slide along the guide rail 15.

The first conducting magnet 33 may be an integrated structure, or a plurality of adjacent first conducting magnets may be provided. The second conducting magnet 34 may be an integrated structure, or a plurality of adjacent second conducting magnets may be provided. The plurality of magnets 32 are uniformly arranged on the second conducting magnet 34 and arranged along the length direction of the guide rail 15.

In an embodiment, a first recessing portion 131 recessed away from the rotor 2 is arranged at a position of the top plate 13 corresponding to the first conducting magnet 33, and the first conducting magnet 33 is arranged in the first recessing portion 131. A second recessing portion 241 recessed away from the stator 1 is arranged at a position of the mounting portion 24 of each of the rotors 2 corresponding to the second conducting magnet 34, and the second conducting magnet 34 is arranged in the second recessing portion 241. In this way, it is convenient to mount and fix the first conducting magnet 33 and the second conducting magnet 34, and there is no need to increase extra layout spaces for the first conducting magnet 33 and the second conducting magnet 34.

In an embodiment, the first position feedback units 4 are scales, which may be either an incremental grating or magnetic grating or an absolute grating or magnetic grating. The second position feedback unit 5 is a reading head corresponding to the first position feedback unit 4.

The marking signals 41 are markers or marked positions on the first position feedback units 4 that can be read by the reading heads. Specific implementations of the marking signals are not excessively limited herein.

In an embodiment, the first position feedback unit 4 constitutes a grating scale, and the second position feedback unit 5 constitutes a reading head corresponding to the grating scale. A plurality of reading heads directly faces the grating scales on each rotor 2.

In an embodiment, the plurality of reading heads and the plurality of coils 31 are electrically connected to an external device or system through a plurality of transmission lines 6.

An operating principle is as follows. When all rotors 2 move towards one direction, the reading heads read position information of the grating scales in real time. When one reading head identifies the marking signal 41, the position of the rotor 2 can be determined. Then, all rotors 2 are sorted in order of positions of all rotors 2 in the linear driving apparatus 100, so as to complete the numbering of all rotors 2. In specific use, it may also be comprehensively interpreted whether the marking signal identified by the reading head is effective according to a variety of information.

Compared with the related art, in the linear driving apparatus 100 in the embodiments, a first position feedback unit 4 is arranged on each rotor 2, a plurality of second position feedback units 5 is spaced at a position of the stator 1 corresponding to the first position feedback unit 4, one first position feedback unit 4 is provided with a marking signal 41, and the second position feedback units are configured to read position information of the first position feedback units 4 and read the marking signals 41. In this way, in the identification of the rotor 2, the marking signal 41 can be read by the second position feedback unit 5 to judge the position of the rotor 2 corresponding thereto, and then when all rotors 2 are numbered, all rotors 2 can be sorted based on rotors 2 of which position information has been acquired, so as to complete the numbering of all rotors 2. When the rotor 2 is identified based on the linear driving apparatus 100, the manner of identifying the rotor 2 can be simplified, and cost of the linear driving apparatus 100 can be further reduced without additional sensors.

The above are merely preferred embodiments of the present disclosure, and are not intended to limit the present disclosure. Any modification, equivalent replacement and improvement made within the spirit and principle of the present disclosure shall be included within the scope of protection of the present disclosure.

What is claimed is:

1. A linear driving apparatus, comprising:
   a plurality of stators successively spliced into a one-piece;
   a plurality of rotors slidably arranged on the plurality of stators;
   a driving component configured to drive the plurality of rotors to slide along an extension direction of the plurality of stators;
   a plurality of first position feedback units, wherein each of the plurality of rotors is provided with one of the plurality of first position feedback units, and one of the plurality of first position feedback units is provided with a marking signal; and
   a plurality of second position feedback units arranged on the plurality of stators and spaced apart from each other, wherein the plurality of second position feedback units is arranged corresponding to the plurality of first position feedback units, and is configured to read position information of the plurality of first position feedback units and read the marking signal,
   wherein when any one of the plurality of second position feedback units reads the marking signal, the second position feedback unit is configured to confirm a position of the rotor corresponding thereto, use the confirmed position of the rotor as a starting point, and sort all rotors according to an order of positions of other rotors in the linear driving apparatus, so as to complete numbering of all rotors.

2. The linear driving apparatus according to claim 1, wherein the plurality of first position feedback units constitutes grating scales; and the plurality of second position feedback units constitutes reading heads corresponding to the plurality of first position feedback units.

3. The linear driving apparatus according to claim 1, wherein each one of the plurality of stators comprises a bottom plate, a top plate arranged in parallel with and spaced from the bottom plate, and a fixation plate that connects the bottom plate with the top plate; and the plurality of first position feedback units is arranged on sides of the plurality of rotors adjacent to the fixation plates, respectively, and the plurality of second position feedback units is arranged on the fixation plates at intervals.

4. The linear driving apparatus according to claim 3, wherein a mounting groove is provided through a position of the fixation plate corresponding to each of the plurality of second position feedback units, and one second position feedback unit is fixedly mounted in the mounting groove.

5. The linear driving apparatus according to claim 3, wherein a guide rail is provided on a side of the bottom plate adjacent to the top plate; at least two pulleys are spaced at intervals on a side of each of the plurality of rotors adjacent to the guide rail, the at least two pulleys on each of the plurality of rotors abut against two sides of the guide rail, respectively, and form a sliding connection, and the plurality of rotors slides freely under the plurality of stators through matching the pulley with the guide rail.

6. The linear driving apparatus according to claim 5, wherein each of the plurality of rotors comprises a fixation portion spaced from the stator, two sliding plates spaced at intervals on a side of the fixation portion adjacent to the guide rail, a mounting portion arranged on a side of the fixation portion away from the bottom plate, an extending portion arranged on a side of the mounting portion adjacent to the fixation plate, and a T-shaped structure portion arranged on a side of the mounting portion away from the fixation plate; the two sliding plates on the rotors abut against the two sides of the guide rail, respectively, and form a sliding connection, the two sliding plates on the plurality of rotors are respectively spaced from the pulleys corresponding thereto, and the T-shaped structure portion extends to a side of the top plate away from the bottom plate and is spaced from the top plate; the pulleys on the plurality of rotors are arranged on a side of the fixation portion adjacent to the guide rail, and the first position feedback unit on each of the plurality of rotors is arranged on a side of the extending portion adjacent to the fixation plate.

7. The linear driving apparatus according to claim 6, wherein four pulleys are arranged on the plurality of rotors, the four pulleys on the plurality of rotors abuts against the two sides of the guide rail in pairs, and the sliding plate is arranged between each pair of the pulleys.

8. The linear driving apparatus according to claim 6, wherein the driving component comprises a plurality of coils arranged on a side of the top plate adjacent to the bottom plate and a magnet arranged on the mounting portion of each of the plurality of rotors, and the magnet corresponds to and is spaced from the coils.

9. The linear driving apparatus according to claim 8, wherein the driving component further comprises a first conducting magnet arranged between the top plate and the plurality of coils and a second conducting magnet arranged between the corresponding mounting portion and the magnet; a plurality of protruding portions protruding towards the rotor are spaced at intervals on a side of the first conducting magnet adjacent to the bottom plate, each of the plurality of coils is arranged around one of the protruding portions; and a plurality of magnets is provided and spaced at intervals on the second conducting magnet.

10. The linear driving apparatus according to claim 9, wherein a first recessing portion recessed away from the rotor is arranged at a position of the top plate corresponding to the first conducting magnet, the first conducting magnet is arranged in the first recessing portion; a second recessing portion recessed away from the stator is arranged at a position of the mounting portion of each of the plurality of rotors corresponding to the second conducting magnet, the second conducting magnet is arranged in the second recessing portion.

* * * * *